No. 608,341. Patented Aug. 2, 1898.
K. S. MURRAY.
DRIVING MECHANISM FOR VELOCIPEDES.
(Application filed Apr. 11, 1898.)
(No Model.) 2 Sheets—Sheet 1.

Witnesses:

Inventor:
Kenneth S. Murray
by Pollard Mauro,
his attorneys

THE NORRIS PETERS CO., PHOTO-LITHO., WASHINGTON, D. C.

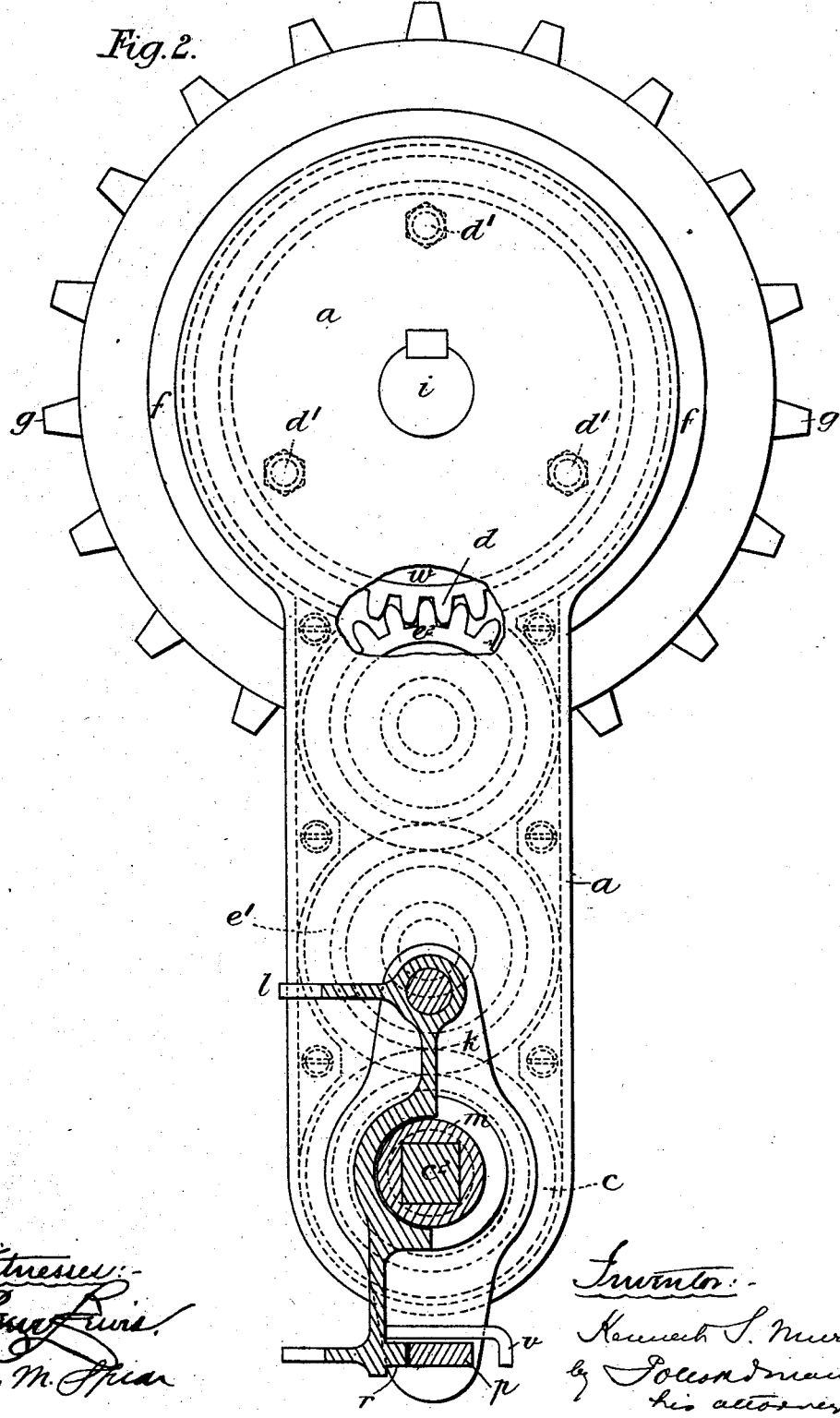

United States Patent Office.

KENNETH S. MURRAY, OF LONDON, ENGLAND, ASSIGNOR OF ONE-HALF TO THOMAS NOBLE HESTER, OF SAME PLACE.

DRIVING MECHANISM FOR VELOCIPEDES.

SPECIFICATION forming part of Letters Patent No. 608,341, dated August 2, 1898.

Application filed April 11, 1898. Serial No. 677,220. (No model.)

*To all whom it may concern:*

Be it known that I, KENNETH SUTHERLAND MURRAY, engineer, a subject of the Queen of Great Britain and Ireland, and a resident of 10 Chelsea Gardens, London, England, have invented certain new and useful Improvements in Driving Mechanism for Velocipedes, (for which I have applied for a patent in Great Britain, No. 15,429, June 29, 1897,) which improvements are fully set forth in the following specification.

The object of this invention is to utilize what is known as the "sun-and-planet motion" in conjunction with an ordinary crank motion so as to obtain variable speeds in velocipedes.

I will describe the invention with reference to the accompanying drawings, (as applied to a bicycle, for example,) of which—

Figure 1:
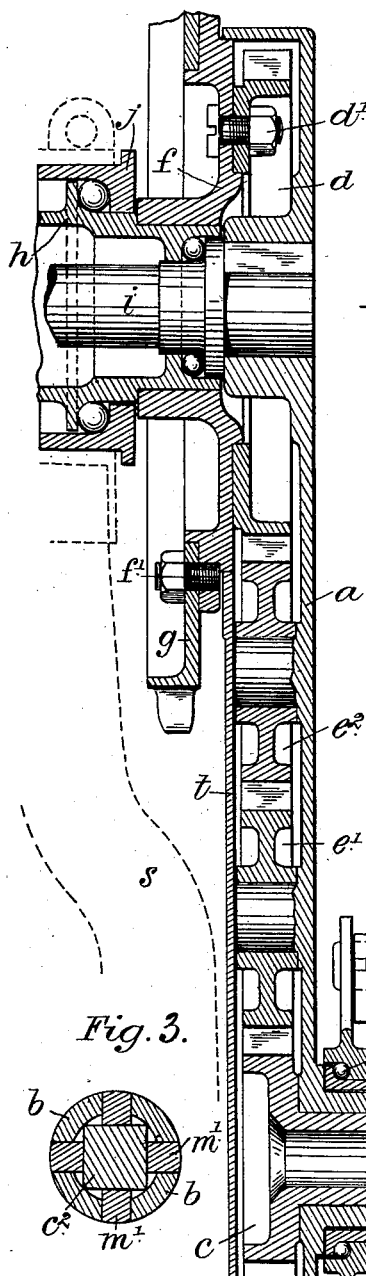
Figure 3:
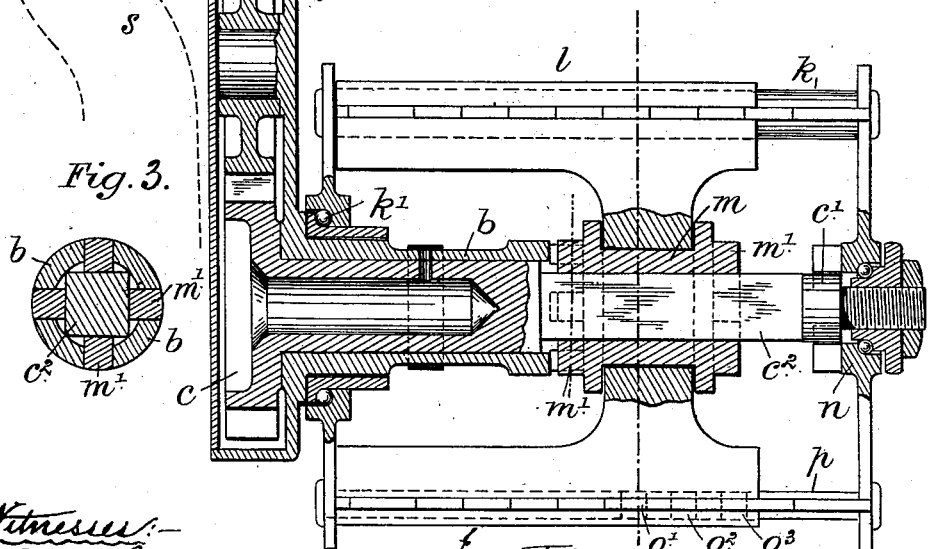

Figure 1 is a vertical section, and Fig. 2 a front view, partly in section, of a bicycle crank and pedal constructed according to my invention; and Fig. 3 is a transverse section of the pedal-pin.

$a$ is a hollow crank, on which at the pedal extremity is formed a sleeve $b$. Fitted to this sleeve is a toothed wheel $c$, which can be caused either to rotate in the said sleeve or be fixed thereto, as hereinafter described. This wheel $c$ constitutes the planet-wheel, and its motion is transmitted to the sun-wheel $d$ through intermediate (or idle) wheels $e'$ and $e^2$, which rotate on pins provided in the hollow crank $a$. The sun-wheel $d$, which is shown in the form of a ring, is connected by screw-bolts $d'$ to the central or body portion $f$ of the sprocket-ring $g$, which is itself attached to the body portion $f$ by screws or bolts $f'$. The body portion $f$ is mounted on a hollow axle $h$, which rotates on ball-bearings at each extremity of the main bracket $j$, one end of which only is shown in Fig. 1. The main crank-axle $i$ rotates on ball-bearings provided within the hollow axle $h$, and to this main crank-axle is keyed the hollow crank $a$, which, for example, may be the right crank, while the other or left crank, which is not shown in the drawings, may be of ordinary construction and keyed to the crank-axle in the ordinary way.

The pedal $k$ is mounted on ball-bearings $k'$ at one end on the sleeve $b$ of the crank $a$ in the manner shown and at its other end on the spindle or shank $c'$ of the planet-wheel $c$, it being either free to revolve thereon on ball-bearings in the manner shown in Fig. 1 or else fixed thereto, as hereinafter described.

On a square or angular-shaped portion $c^2$ of spindle or shank of planet-wheel $c$ is fitted to slide a collar $m$, on which is mounted the foot-rest $l$, in which the collar $m$ is free to revolve. On each end of the collar $m$ are clutch-teeth $m'$, (shown in section in Fig. 3,) arranged to engage in corresponding recesses provided in the extremity of the sleeve $b$ and in the inner side of the outer frame $n$ of the pedal $k$.

$o'$, $o^2$, and $o^3$ (shown in dotted lines in Fig. 1) are grooves cut in the rectangular member $p$ of the pedal-frame, and $r$, Fig. 2, is a projection on the sliding foot-rest $l$, which projection engages with one or other of these grooves, according to the position of the foot-rest.

$s$ (shown by dotted lines in Fig. 1) is the outline of a portion of the fork-frame supporting the rear or driving wheel of the bicycle.

$t$ is a plate fitted to the back of the crank and inclosing the gear-wheels.

I will now describe the action of the mechanism. Suppose it be desired to work the bicycle without any intermediate gearing while the bicycle is in motion. The right foot, which is on the sliding foot-rest $l$ of pedal $k$, is pressed inward, so as to cause the clutch-teeth $m'$ on the inner side of the sleeve $m$ to enter the recesses formed on the end of the sleeve $b$, as shown in Fig. 1. This locks the geared wheels to the crank $a$ and sprocket-ring $g$, while the pedal $k$ itself is free to revolve on the ball-bearings shown at each of its extremities, and only the outer or hollow axle $h$ rotates on its bearings within the main bracket $j$, and the method of propulsion is exactly the same as that of an ordinary bicycle.

Suppose a fast speed be desired. The sliding foot-rest $l$ is pressed outward until the clutch-teeth $m'$ on the outer side of the sliding collar $m$ enter the recesses provided on the inner side of the outer frame $n$ of pedal $k$. The planet-wheel $c$ is then locked to the pedal $k$, but is free to rotate in the sleeve $b$ of the crank $a$. It will thus be seen that so long as the pedal $k$ is maintained in a horizontal position, while the crank revolves as before, a sun-and-planet movement is set up through the intermediate wheels $e'$ and $e^2$ between the planet-wheel $c$ and the sun-wheel $d$, to which the sprocket-ring $g$ is attached. Multiplied speed in proportion to the diameters of the sun and planet wheels will thus be imparted to the sprocket wheel or ring $g$, the hollow axle $h$ and the main crank-axle $i$ each having separate movements imparted to them. It will be seen that the extra power exerted by the rider to effect this fast-speed gear is to a large extent that utilized to resist the tendency of the pedal to turn under the foot of the rider, and it will also be seen that power in this form will be expended by the right foot only. It is necessary, however, that on the upstroke of the right foot the tendency of the pedal to turn must still be resisted in order that the gearing may work continuously, and for this purpose, therefore, (as the gearing is preferably only employed for light riding,) instead of relieving the pedal of all pressure on the upstroke, as is customary, a portion of the pressure must be continued, so as to overcome this turning tendency of the pedal. The work of the right leg relieved on the upstroke of the crank will be transferred to the downstroke of the left leg, so that the total expenditure of power on each leg may to a large extent be controlled within the discretion of the rider, thus rendering a similar crank for the left foot unnecessary. By employing suitable heel and toe plates at the front and back of the right pedal additional power may, if desired, be imparted to the foot to resist this turning tendency of the pedal either in forward propulsion or in resisting the momentum of the bicycle.

When the foot-rest $l$ is in an intermediate position on the pedal $k$, the teeth $m'$ on the sliding collar $m$ are disengaged from the pedal-frame $n$ and sleeve $b$ on the crank, and the cranks can be held at rest while the bicycle is in motion. The grooves $o'$, $o^2$, and $o^3$ are provided to insure fixed positions of the sliding foot-rest $l$, and by tilting the foot-rest, which turns on the front member $k$ of the pedal, as shown, so as to relieve the weight on the back member $p$ of the pedal, the projection $r$, Fig. 2, can be caused to pass over or engage with either one of the grooves $o'$ $o^2$ $o^3$ at the discretion of the rider. $v$ is a catch-pin carried by the foot-rest and arranged to engage with the member $p$ of the pedal to prevent the foot-rest from turning right over. The hollow crank $a$ is shown broken at $w$ in Fig. 2 to illustrate the gearing working within it.

Although I have described the gearing as being applied to the right pedal such gearing may be applied to the left pedal or to both pedals, if desired, and the details of construction may be considerably varied without departing from the nature of the invention.

Having now particularly described and ascertained the nature of this invention and in what manner the same is to be performed, I declare that what I claim is—

In driving mechanism for velocipedes, the combination with an ordinary crank motion, of a sun-and-planet motion, the sun-and-planet gears being inclosed in a hollow crank; a sleeve on the outer end of the crank, a stem or shank on the planet-wheel fitted to turn in the said sleeve, a square portion on the said stem or shank, a slidable collar on the square portion of the stem or shank, teeth or projections on the ends of the slidable collar to engage with recesses in the end of the sleeve on the crank or in recesses in the pedal-frame, and a sliding foot-rest on the pedal for moving the collar along the shank of the planet-wheel so as to cause it to engage either with the sleeve or with the pedal-frame to alter the speed of the velocipede as required, said foot-rest having teeth thereon adapted to engage corresponding teeth on the pedal and being mounted on the pedal so as to tilt thereon, whereby said teeth may be disengaged when it is desired to slide the foot-rest on the pedal, substantially as described.

In testimony whereof I have signed this specification in the presence of two subscribing witnesses.

K. S. MURRAY.

Witnesses:
  GEORGE WILLIAM JOHNSON,
  WILLIAM FREDERICK UPTON.